United States Patent [19]

Förster et al.

[11] Patent Number: 4,613,375

[45] Date of Patent: Sep. 23, 1986

[54] CARBON PASTE AND PROCESS FOR ITS MANUFACTURE

[75] Inventors: Ludwig Förster, Bad Säckingen; Alois Franke, Rheinfelden; Reinhard Nobel, Wehr, all of Fed. Rep. of Germany

[73] Assignee: Swiss Aluminium Ltd., Chippis, Switzerland

[21] Appl. No.: 707,857

[22] Filed: Mar. 4, 1985

[30] Foreign Application Priority Data

Mar. 7, 1984 [CH] Switzerland .................... 1129/84

[51] Int. Cl.$^4$ ............................................ C08L 95/00
[52] U.S. Cl. .............................. 106/281 R; 204/294; 252/510
[58] Field of Search .................... 204/294; 106/281 R, 106/284; 252/510

[56] References Cited

U.S. PATENT DOCUMENTS

| | | | |
|---|---|---|---|
| 3,303,119 | 2/1967 | Dell | 204/294 |
| 3,442,787 | 5/1969 | Landrum et al. | 204/294 |
| 4,116,708 | 9/1978 | Tarver et al. | 106/281 R |
| 4,264,371 | 4/1981 | Dell | 106/284 |

*Primary Examiner*—Lorenzo B. Hayes
*Attorney, Agent, or Firm*—Bachman & LaPointe

[57] ABSTRACT

A carbon paste for self-calcining electrodes, refractory linings and connections of electrode joining points contains as binder bitumen comprising 70–90 wt-% hard bitumen and 10–30 wt-% soft bitumen. To increase the dry residue of the bitumen and to improve the burning-off properties of the mass, 0.3–2 weight percent of additives can be added, in particular Al, $Al_2O_3$, B, $B_2O_3$, Si and/or $SiO_2$. The production of the carbon paste is such that the solid fraction is mixed at 130°–180° C. to a homogeneous mass then the hard bitumen, followed by the soft bitumen added slowly in a highly fluid form accompanied by intensive stirring. The paste is then intensively mixed further and cooled after removing from the mixer.

13 Claims, No Drawings

CARBON PASTE AND PROCESS FOR ITS MANUFACTURE

BACKGROUND OF THE INVENTION

The invention relates to a carbon paste for self-calcining electrodes, in particular Soederberg anodes, refractory linings and connections for electrode joining points, having granulates of anthracite, graphite, petroleum coke, pitch coke, metallurgical coke and/or residual lining or electrode material as solid component and also a binder, and relates too to a process for manufacturing this carbon paste.

Refractory linings, self-calcining electrodes and connections for electrode joining points are usually made from carbon masses which are produced from calcined or graphitized solids and binders. Coal-tar pitch is widely used as a binder, as it usually exhibits a large dry or coke residue, as a rule 50–60 wt %, on calcining or graphitizing. Known from U.S. Pat. No. 3,261,892 is the production of preshaped electrodes in which powder-to-granular type carbon particles are sprayed with 5–15 volume percent liquid bitumen (with respect to the electrode volume), brought into a chosen shape and baked at about 300° C. in an exothermic oxidation process.

British Pat. No. 1 434 824 describes a process for producing pre-shaped electrodes. Ground, calcined carbon fibers and a binder that can be coked are mixed together at a temperature at which the binder is liquid. Bitumen is mentioned there as one of the cokeable binders.

In the German standard DIN No. 55946 bitumen is defined as the dark, semi-solid to brittle, high molecular hydrocarbon mixture which can be melted, produced in the selective refining of mineral oils, also the fraction of natural asphalts that is soluble in carbon disulphide, and native paraffin and montan wax.

In none of these documents is reference made to health aspects.

Various investigations have shown that coal tar pitch contains polycyclic aromatic hydrocarbons which can escape in a gaseous form during production and/or use of refractory linings and self-calcining electrodes. The polycyclic aromatic hydrocarbons can be carcinogenic. The binder vapors evolved during the production or use of the carbon pastes of the kind mentioned hereinabove containing coal tar pitch as binder are therefore capable of being a health hazard for the industrial employee and for the environment in general.

In a number of west european countries and in the USA there already exist therefore regulations designed to protect the industrial employee from potentially hazardous binder vapors. Such regulations are expected in other countries in the near future.

The manufacturer is refractory furnace linings and electrodes or their users are now faced with the obligation to reduce the potentially hazardous polycyclic aromatic hydrocarbons to the legally specified limits using scrubbers or to render the vapors harmless in some other way.

SUMMARY OF THE INVENTION

The object of the present invention is therefore to develop an improved carbon paste for self-calcining electrodes, in particular Soederberg anodes, refractory linings and connections for electrode joining points and a process for manufacturing the carbon paste, such that neither the manufacture nor the use of refractory linings, self-calcining electrodes or electrode connections gives rise to polycyclic aromatic hydrocarbons in concentrations which represent a health hazard but at the same time provides products that are, according to the state of the art, high grade and economical to produce.

With respect to the carbon paste the object is achieved by way of the invention in that the binder comprises 70–90 wt % hard bitumen and 10–30 wt % soft bitumen.

Here and in the following specification hard bitumen is to be understood as a bitumen with a softening point of about 80°–110° C., according to the ball and ring test, and soft bitumen with a softening point of about 40°–65° C., the density of both types of bitumen being not greater than 1.1 g/cm$^3$ (at 25° C).

DETAILED DESCRIPTION

In contrast to coal tar pitch, bitumen contains polycyclic aromatic hydrocarbons only in extremely low concentrations which are non-hazardous for the health of industrial employees. In particular, polycyclic aromatics with a ring number of 4–6 are not expected in the vapors produced during the heating up of the binder. The vapors given off during the manufacture or use of the carbon paste comprise mainly naptheno-aromatics and alkylaryls. Consequently there is no carcinogenic risk either during the production of the carbon paste or during the use of the same e.g. as a refractory furnace lining or self-calcining electrode.

The patent publications mentioned above could possibly provide some stimulus towards solving the given problem but do not provide actual solutions. For example in none of these is reference made to the non-hazardous aspect of bitumens with respect to health; also these documents refer to shaped items in particular solid electrodes for which it is known that the carbon paste must have a different consistency for the shaping process then that of a paste for refractory linings e.g. for furnaces or crucibles, Soederberg anodes or for casting-in electrode connections. For such latter applications the paste must exhibit much higher plasticity than for solid electrodes.

A higher plasticity paste is normally expected by addition of more binder than is necessary for binding the carbon particles, as a result of which the concentration of hazardous polycyclic aromatic hydrocarbons is increased. If this approach is taken using only soft bitumen then one finds that, when the desired plasticity is reached, the product is too sticky for proper handling. On using such a paste for Soederberg anodes one finds that within 5 weeks a bitumen liquid deposit rises and forms on the surface of the anode, as can occur when using coal tar pitch. Otherwise, the use of soft bitumen for binder, in the same amounts as coal tar pitch, leads to a low dry residue and thus to high porosity and inadequate bonding of the solid particulate material. If, on the other hand, one employs only hard bitumen and attempts to reach the necessary plasticity that way, then the result is not completely satisfactory. The plasticity is achieved only in the heated carbon paste. If the paste cools, then its plasticity is reduced to such an extent that it can no longer be processed for the above mentioned purposes because of inadequate flow behavior.

Only if hard and soft bitumens in the ratio according to the invention are used, are carbon pastes with the desired properties obtained.

In view of the known low level of dry residue when using about 38 wt % bitumen instead of about 50–60 wt % coal tar pitch the expert in the field has up to now assumed that it is basically inappropriate to use bitumen as a binder for the production of carbon pastes for self-calcining electrodes, especially Soederberg anodes and refractory linings, in furnaces and crucibles and connections for electrode joining points. This low opinion of bitumen for the above mentioned purposes is all the more surprising in view of the fact that the problem of a health hazard in using coal tar pitch based binders for carbon pastes has long been known in this field and, at the same time, bitumen was known to be much less hazardous in this respect.

Only in accordance with the present invention has it been possible to overcome this prejudice against the use of bitumen for the applications according to the invention.

For the first time it has been found that in using bitumen as binder for carbon pastes for the above mentioned purposes it is not a question of the amount of bitumen used but also the quality of the binders and in particular the ratio of the different qualities used.

In the ready-to-use state the carbon pastes according to the invention exhibit both a high electrical conductivity and a high thermal stability. Self-calcining anodes (Soederberg anodes and crucibles or furnace linings) made with the carbon paste according to the invention and contact paste for electrode connections also exhibit good resistance to mechanical and chemical effects. The carbon pastes according to the invention therefore meet the desired quality requirements.

Surprising for the expert, apart from the high quality achieved, is the economic competitiveness of the carbon paste according to the invention; in view of the low level of dry residue of bitumen, the use of two different bitumens on an industrial scale and from the economic stand point must seem a hopeless venture to the expert in the field.

The carbon paste comprises usefully of 60–90 wt % solids, in particular 68–87 wt % solids, and 10–40 wt % bitumen, in particular 13–32 wt % bitumen. In keeping with the state of the art granulated anthacite, graphite, petroleum coke, pitch coke and/or metallurgical coke are usefully employed as the solid component. In particular applications granulated spent linings or anode butts can be used additionally or exclusively for the solids fraction. The particle size of the granulate is usefully 0–14 mm.

The solids, their granulometry, the composition of the bitumen used and the ratio of solids to bitumen are varied according to the requirements; this means that, for example, the plasticity, the softening point or the ash content must be variable within certain limits.

To increase the dry or coke residue of the bitumen and to improve the burning-off behavior of the paste, for example for Soederberg anodes, one adds 0.3–2 wt % inorganic additives preferably 0.5–1.5 wt % with respect to the carbon paste. These additives are, in particular, Al, $Al_2O_3$, B, $B_2O_3$, Si and/or $SiO_2$.

With respect to the process for manufacturing the carbon paste the object is achieved by way of the invention in that the solid component is mixed to a homogeneous mass and heated to 130°–180° C., the hard bitumen is heated to a temperature in the range 150°–220° C., however above the temperature of the solids fraction, and introduced slowly in a highly fluid state to the solids, accompanied by intensive mixing, the soft bitumen is heated to a temperature of 70°–100° C., brought to a highly fluid form and again with intensive mixing introduced slowly after the hard bitumen has been added, and the carbon paste is mixed further for at most 60 minutes at the temperature to which the solids fraction was heated, then removed from the mixer and cooled.

The warm carbon paste is usefully cooled by pouring it through a sieve above a tank of cold water; the carbon paste solidifies in the form of pine-cone shaped grains as it is quenched by the cold water in the tank.

The warm carbon paste can also be cooled and allowed to solidify without dividing it up; the resultant mass can be ground to a granulate form in a crushing facility. Surprisingly, a very good quality product can be obtained if the higher melting point bitumen is added first then the lower melting point bitumen.

If the reverse procedure is employed, the lower melting point binder penetrates the pores in the solids fraction with the result that there is no longer any available as an actual binder; the amount of binder matrix is thus reduced. In order to produce a quality of carbon paste in keeping with the state of the art this loss of binder must be made good. In turn, at the cooking stage, this leads to an increase in the pore volume of the binder matrix and with that a weakening of the same.

Many possibilities exist for using the carbon paste, for example: cathode linings, Soederberg anodes, anode rods with protective collars for pre-baked anodes used in the fused salt electrolytic production of aluminum, linings for crucibles, blast furnaces, electric arc furnaces, electric reduction furnaces for producing crude iron, ferrous alloys, calcium carbide, phosphorus and corundum.

The invention is explained in greater detail in the following by way of examples.

EXAMPLE 1

A ramming mass for lining the furnace floor and walls for metallurgical processes contained the following components: 45 wt % anthracite, 33 wt % petroleum coke and 22 wt % bitumen (16 wt % hard, 6 wt % soft). The anthracite fraction had the following granulometry (sieve analysis): 5–14 mm: 29%, 1–5 mm: 42%, 0–1 mm: 19%. The whole of the petroleum coke fraction had a particle size $\leq 0.1$ mm.

The solids fraction of anthracite and petroleum coke was heated to 160° C. and mixed to a homogeneous mass at this temperature. The hard bitumen, heated to 190° C. followed by the soft bitumen which had been heated to 90° C., was then added slowly and such that the solid particles became coated with binder. During the addition of the highly fluid binder the intensive stirring action was continued, at the same time keeping the mixing temperature at about 160° C.

The mixture was stirred intensively for further approx. 20 minutes, after which good homogeneity was obtained. The warm carbon paste was then poured through a heated sieve into cold water where the mass solidified in a granular form. These can be employed e.g. for monolithic furnace linings or self-calcining electrodes of various size and dimensions.

By using this carbon paste it was possible to reduce the amount of polycyclic aromatic hydrocarbons in the paste to 11 $\mu g/g$ compared with 17,000 $\mu g/g$ when using coal tar pitch. The amount of polycyclic aromatic hydrocarbons the industrial employee was exposed to was 150 μg/m³ when using coal tar pitch. Using bitumen as binder in the present example the concentration of polycyclic aromatic hydrocarbons feel to 9 μg/m³.

EXAMPLE 2

A carbon paste having 68 wt % petroleum coke as solids and 32 wt % bitumens as binder was prepared as in example 1, in this case for Soederberg anodes to be used in an aluminum smelter. The granulometry (sieve analysis) of the petroleum coke was as follows: >8 mm: 3%, 3–8 mm: 20%, 1–3 mm: 12%, <1 mm: 65%. The ratio of bitumens employed was 90 wt % hard to 10 wt % soft bitumen.

The concentration of polycyclic aromatic hydrocarbons measured in the work place atmosphere around the pots was a simular low value as in the first example, viz., 7 μg/m³. Thanks to the carbon paste according to the invention it is not necessary to change the technology used with the cell e.g. increase the anode stock in the Soederberg cell.

In another version 1.0 wt % aluminum oxide was added. The Soederberg anodes showed normal buring-off behaviour without crumbling and without dissociating (no liquid deposit forming).

EXAMPLE 3

Using the process described in the first example carbon pastes were prepared, incorporating different amounts of residual anode material into them. The paste was prepared from:
(a) 83.5 wt % petroleum coke, 14.5 wt % hard bitumen and 2 wt % soft bitumen. The granulometry (sieve analysis) of the solids was: >8 mm: 5%, 3–8 mm: 25%, 1–3 mm: 25%, <1 mm: 45%.
(b) 67 wt % petroleum coke, 17 wt % anode butt material, 14 wt % hard bitumen and 2 wt % soft bitumen. The solids had the following granulometry (sieve analysis): >8 mm: 3%, 3–8 mm: 20%, 1–3 mm: 25%, <1 mm: 52%.
(c) 84 wt % anode butt material, 13 wt % hard bitumen and 3 wt % soft bitumen. The granulometry (sieve analysis) of the solid component was: >8 mm: 5%, 3–8 mm: 25%, 1–3 mm: 25%, <1 mm: 45%.

The anode manufacturer is able to mix the carbon pastes in the ratio appropriate to the application.

In spite of the substances e.g. sodium fluoride and calcium fluoride, which are contained in the anode butt material and exert a negative influence on the burning-off behaviour of the carbon mass, and also the small amount of aluminum fluoride present which in this respect tends to have a positive effect, it was possible to produce a high quality paste with the inclusion of recycled material as, apparently, because of the low pore volume, this dense material is able to take up less of the binder.

EXAMPLE 4

Electric furnaces for manufacturing corundum are lined at the bottom and sides with a refractory material which is made from a carbon paste. A carbon paste comprising 87 wt % anthracite, petroleum coke or electrode residue and 13 wt % bitumen (10 wt % hard, 3 wt % soft) was prepared as described in example No. 1. The ground solids had the following granulometry (sieve analysis): >8 mm: 3%, 3–8 mm: 13%, 1–3 mm: 23%, <1 mm: 61%.

The paste produced for the same purpose and containing coal tar pitch as binder always release such a large quantity of polycyclic aromatic hydrocarbons during the calcining of the lining that special measures have to be taken to protect the employee e.g. filtration of the surrounding air. When using the carbon paste according to the invention these measures are not necessary as such high concentrations of polycyclic aromatic hydrocarbons do not occur.

What is claimed is:

1. Carbon paste which comprises a solid carbonaceous component and a binder component, wherein the bindercomponent contains 70–90 weight percent hard bitumen having a softening point of about 80°–110° C. and 10–30 weight percent soft bitumen having a softening point of about 40°–65° C., to provide a non-hazardous product characterized by high electrical conductivity and high thermal stability.

2. Carbon paste according to claim 1 wherein said solid carbonaceous component is a material selected from the group consisting of granulated anthracite, graphite, petroleum coke, pitch coke, metallurgical coke, spent refractory lining material, spent electrode material and mixtures thereof.

3. Carbon paste according to claim 1 wherein said hard bitumen has a softening point of about 80°–110° C., said soft bitumen has a softening point of about 40°–65° C., and both the hard and soft bitumen have a density not greater than 1.1 g/cm³ at 25° C.

4. Carbon paste according to claim 1 wherein the solid carbonaceous component is a material selected from the group consistng of self-calcining electrodes, Soederberg anodes, refractory linings, and connections for electrode joining points.

5. Carbon paste according to claim 1 wherein the solid component is 60 to 90 weight percent and the binder component is 10 to 40 weight percent.

6. Carbon paste according to claim 5 wherein the solid component is 68 to 87 weight percent and the binder component is 13 to 32 weight percent.

7. Carbon paste according to claim 1 including 0.3–2 weight percent inorganic additives.

8. Carbon paste according to claim 7 including 0.5–1.5 weight percent inorganic additives.

9. Carbon paste according to claim 7 wherein said inorganic additives are selected from the group consisting of Al, $Al_2O_3$, B, $B_2O_3$, Si, $SiO_2$ and mixtures thereof.

10. Process for manufacturing carbon paste which comprises: providing a solid carbonaceous component and a binder component, wherein the binder component contains 70–90 weight percent hard bitumen having a softening point of about 40°–65° C. and 10–30 weight percent soft bitumen having a softening point of a about 80°–110° C.; mixing the solid component to a homogeneous mass and heating said solid component to a temperature of 130°–180° C.; heating the hard bitumen to a temperature above the temperature of the solid component in the range of 150°–220° C.; slowly adding the hard bitumen to the solid component to form a first mixture and mixing said first mixture; heating the soft bitumen to a temperature of 70°–100° C.; slowly adding the soft bitumen to the first mixture to form a second mixture and mixing said second mixture; and further mixing the second mixture for less than 60 minutes at a temperature of 130°–180° C., to provide a non-hazardous product characterized by high electrical conductivity and high thermal stability.

11. Process according to claim 10 wherein the hard bitumen is added to the solid carbonaceous component in a fluid state, and the soft bitumen is added to the first mixture in a fluid state.

12. Process according to claim 10 including cooling the product to solidify same.

13. Process according to claim 12 wherein the cooling is by quenching.

* * * * *

UNITED STATES PATENT AND TRADEMARK OFFICE
CERTIFICATE OF CORRECTION

PATENT NO. : 4,613,375

DATED : September 23, 1986

INVENTOR(S) : LUDWIG FORSTER ET AL.

It is certified that error appears in the above-identified patent and that said Letters Patent is hereby corrected as shown below:

In Column 6, claim 10, line 54, change "40°-65°" to read ---80°-110°---.

In Column 6, claim 10, line 55, delete "a". 1st occurrence.

In Column 6, claim 10, line 56, change "80°-110°" to read ---40°-65°---.

Signed and Sealed this

Second Day of December, 1986

Attest:

DONALD J. QUIGG

Attesting Officer

Commissioner of Patents and Trademarks